United States Patent [19]

Inoue

[11] 4,170,789
[45] Oct. 9, 1979

[54] MAGNETIC TAPE RECORDING AND REPRODUCTION APPARATUS

[75] Inventor: Satoshi Inoue, Ibaragi, Japan

[73] Assignee: Matsushita Electric Industrial Co., Ltd., Osaka, Japan

[21] Appl. No.: 842,873

[22] Filed: Oct. 17, 1977

[30] Foreign Application Priority Data

Oct. 18, 1976 [JP] Japan ................... 51-125304

[51] Int. Cl.² ...................... G11B 15/48; G11B 15/22
[52] U.S. Cl. ................... 360/137; 360/74.1; 242/191
[58] Field of Search ............ 360/74, 75, 105, 137; 242/191

[56] References Cited

U.S. PATENT DOCUMENTS

| 3,946,436 | 3/1976 | Takashino | 242/191 |
| 4,000,514 | 12/1976 | Fukatsu | 360/74 |
| 4,021,856 | 5/1977 | Motoyama et al. | 360/74 |
| 4,031,556 | 6/1977 | Ban et al. | 360/74 |
| 4,052,742 | 10/1977 | Pastor et al. | 360/74 |

Primary Examiner—Robert S. Tupper
Attorney, Agent, or Firm—Wenderoth, Lind & Ponack

[57] ABSTRACT

A magnetic tape recording and reproduction apparatus which is equipped with an improved safety device for automatic stopping. An automatic stopping arrangement for the apparatus is rendered inoperative by interrupting transmission of power from a motor to a magnetic tape running and stopping detecting device when a simply constructed push-button operating mechanism is in an inoperative state for stable and accurate functioning of the apparatus.

3 Claims, 17 Drawing Figures

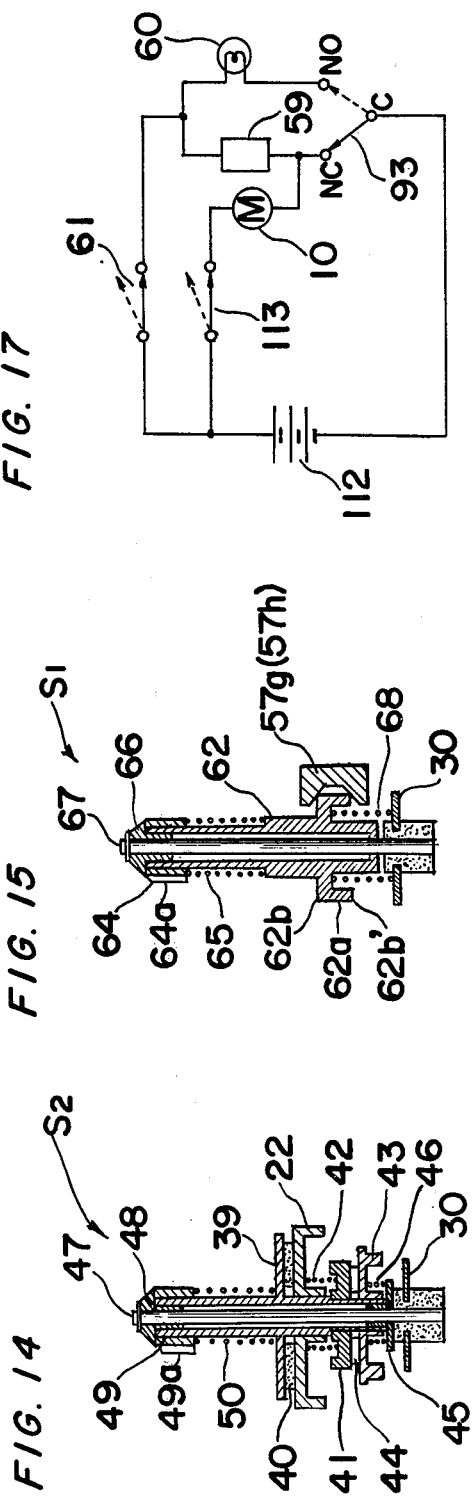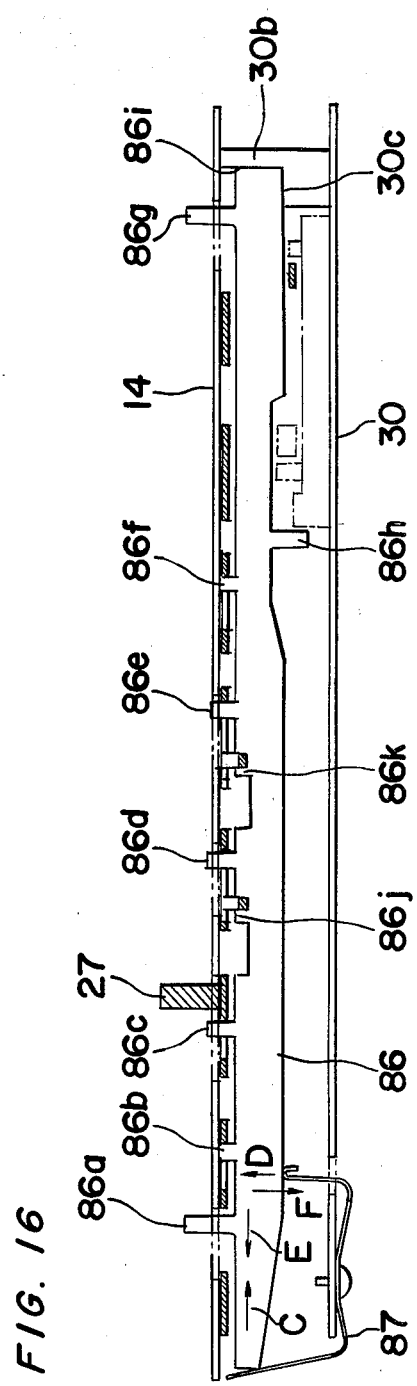

MAGNETIC TAPE RECORDING AND REPRODUCTION APPARATUS

BACKGROUND OF THE INVENTION

The present invention relates to a magnetic tape recording and reproduction apparatus and more particularly, to a magnetic tape recording and reproduction apparatus having an automatic shut down or stopping means which detects stoppage of a magnetic tape, for example, at the end of the running of the tape during recording, reproduction, fast forwarding, rewinding, etc., for returning various operating members of the apparatus to stopped positions by power transmitted from a motor.

Generally, in magnetic tape recording and reproduction apparatuses having an automatic stopping means as described above, for temporarily stopping the running magnetic tape during recording and reproduction, such automatic stopping means is unnecessarily actuated if the running tape is merely stopped. Meanwhile, for a so-called "cue" operation (i.e., fast forwarding during reproduction) or "review" operation (i.e., rewinding during reproduction), it is a common practice to temporarily stop the running tape when changing over from the state of reproduction to fast forwarding or rewinding for preventing undue tension from being exerted on the tape. This arrangement, however, has the disadvantage that the automatic stopping means as described above tends to be undesirably actuated during the "cue" or "review" operation.

In order to overcome the disadvantages as described above, there have been proposed various arrangements, all of which, however, still have problems in that different structures are required for the temporary stopping of the running tape and for "cue" and "review" operations of the same tape, or that, even when the structures for such operations are the same, the number of component parts involved is quite large with consequent complication of the mechanisms, and it is therefore very difficult to provide a magnetic tape recording and reproduction apparatus of the above described type having a simple construction and yet having high accuracy and reliability at a low manufacturing cost.

Accordingly, an essential object of the present invention is to provide a magnetic tape recording and reproduction apparatus equipped with an automatic stopping means having a safety device for the automatic stopping which is highly accurate and reliable in operation, with substantial elimination of the disadvantages inherent in the conventional magnetic tape recording and reproduction apparatuses of this kind.

Another important object of the present invention is to provide a magnetic tape recording and reproduction apparatus of the above described type which has a simple construction, a small member of parts, and which can be manufactured at low cost.

In accomplishing these and other objects, according to one preferred embodiment of the present invention, the magnetic tape recording and reproduction apparatus is equipped with an improved automatic stopping safety device which includes means for automatic stopping so arranged as to cause an operating member to return to a stopping position by power supplied from a motor, a sliding member having magnetic heads mounted thereon and governing running and stopping of a magnetic tape during recording and reproduction according to a predetermined advanced position of said sliding member and a position thereof retracted by more than a predetermined amount from said predetermined advanced position, a first actuating member which causes said sliding member to retract by more than a predetermined amount during a temporary stopping operation, a second actuating member which causes said sliding member to retract by more than a predetermined amount during cue and review operations, and a third acutating member which causes said automatic stopping means to be substantially inoperative when said sliding member has been retraced by the predetermined amount during recording and reproduction. In the arrangement as described above, when the push-button operating mechanism is in an inoperative position, the automatic stopping means is kept inoperative by interrupting the power transmitted from the motor to the tape running and stopping detecting device by a simple mechanism so as to achieve accurate and stable functioning of the apparatus, with appreciable reduction of wear or deformation of the various components, whereby a magnetic tape recording and reproduction apparatus with high reliability can be provided at low manufacturing cost.

BRIEF DESCRIPTION OF THE DRAWINGS

These and other objects and features of the present invention will become apparent from the following description of a preferred embodiment thereof taken in conjunction with the accompanying drawings, in which;

FIG. 14 is a side sectional view showing, on an enlarged scale, the construction of a take up reel base portion of the apparatus of FIGS. 1 and 2, FIG. 15 is a view similar to FIG. 14, but particularly shows construction of a supply reel base portion of the apparatus of FIGS. 1 and 2, FIG. 16 is a sectional view taken along the line XVI—XVI of FIG. 2, and FIG. 17 is an electrical circuit diagram of an electrical circuit employed in the apparatus of FIGS. 1 and 2.

Before the description of the present invention proceeds, it is to be noted that like parts are designated by like reference numerals throughout several views of the accompanying drawings.

DETAILED DESCRIPTION OF THE INVENTION

Figure 1:
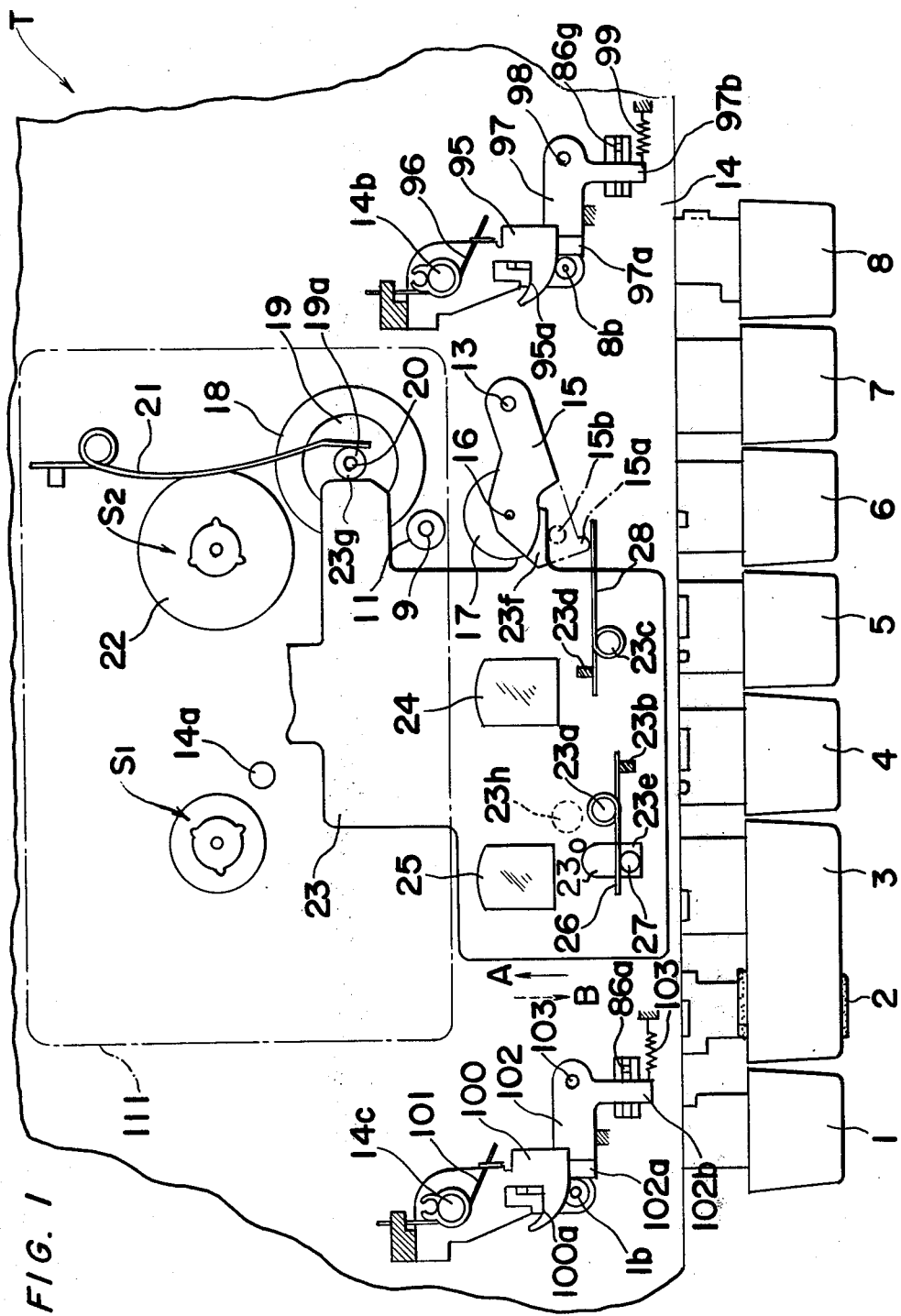
FIGS. 1 and 2 are schematic top plan views, partly broken away and in section, showing arrangements of various components of a magnetic tape recording and reproduction apparatus of the invention when it is in a stopped condition.
Figure 2:
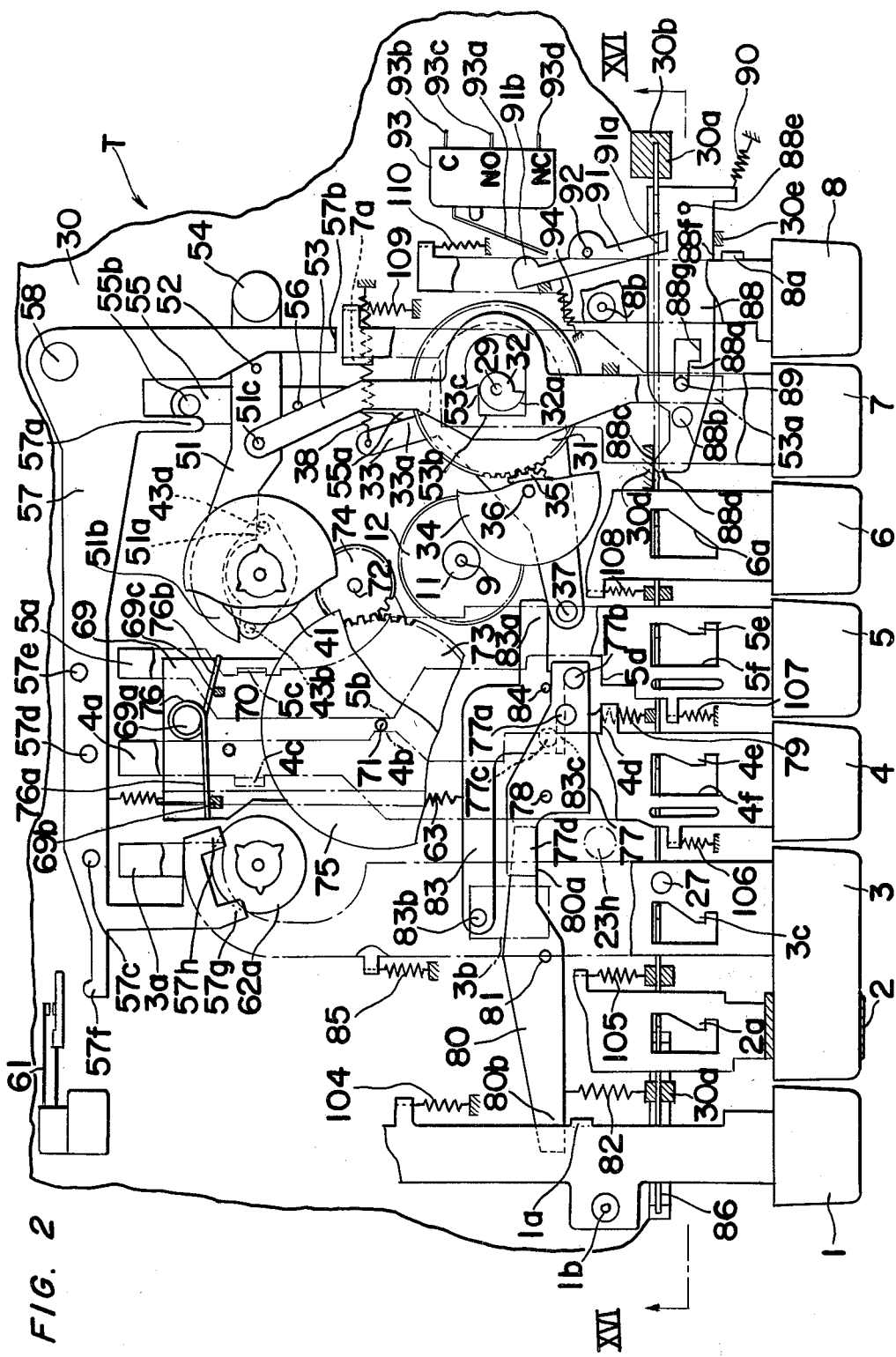

Referring now to the drawings, there are schematically shown in FIGS. 1 and 2 main portions of a magnetic tape recording and reproduction apparatus T according to the present invention in a stationary state. The apparatus T generally includes a payoff or supply reel spindle S1, a take-up reel spindle S2, a set of control push-buttons, for example, a temporary stopping or pause push-button 1, a recording push-button 2, a reproduction push-button 3, a rewinding push-button rod 4, a fast forwarding push-button 5, a stopping push-button rod 6, a tape cartridge eject push-button 7, an automatic stopping change-over push-button 8, etc., each secured to a corresponding push button rod, a capstan 9 which is rotated at a constant speed by a motor 10 (FIG. 17) and to which a capstan pulley 11 and a capstan gear 12 are secured, a shaft 13 fixed to an upper base plate 14 (FIG. 1) and having a pinch roller arm 15 pivotally mounted on the shaft 13, with the pinch roller arm 15 further having a pinch roller 17 which is rotatably mounted on a pin 16 fixed to the arm 15, an idler 18 which is pivotally connected a shaft 20 on a disc-like lever member 19 slidably mounted on the upper base plate 14, with a central projection 19a of the lever member 19 being urged toward the left in FIG. 1 to contact an idler restricting portion 23g of a head base plate 23 by a spring member, for example, a wire spring 21, and the head base plate 23 being slidably mounted on the upper base plate 14 by steel balls (not shown) or the like for selective sliding movements in directions shown by the arrows A and B and having, for example, a magnetic recording and reproduction head 24 and a magnetic erasing head 25 mounted on said base plate 23.

The apparatus T further includes a spring 26 which is mounted at its central portion on a pin 23a fixedly mounted on the head base plate 23 and has its one end engaged with a projection 23b on the base plate 23, with the other end of the spring 26 contacting a pin 27 which extends upwardly from the rod for the reproduction push-button 3 through an elongated opening 23$_O$ formed in the base plate 23 for advancing the base plate 23 in the direction A in a manner described later, and another spring 28 mounted at its central portion on a pin 23c secured to the head base plate 23, with one end of the spring 28 contacting a projection 23d on the base plate 23, while the other end thereof is engaged with a spring receiving portion 15a of the pinch roller arm 25. Although the head base plate 23 is subjected to a force for advancing it in the direction of the arrow A by the spring 26, it is held in a stationary position during the stopping period, since one edge 23e of the elongated opening 23$_O$ of the base plate 23 contacts the pin 27 on the rod of the reproduction push-button 3. Similarly, the pinch roller arm 15 urged in clockwise rotation about the pin 13 by the spring 28 is also held in a stationary position, since a pin 15b secured to the pinch roller arm 15 is engaged with an engaging projection 23 on the head base plate 23f. Adjacent to the reel spindle S1, there is provided a pin 14a which is integral with the upper base plate 14 for restricting the amount of advance of the head base plate 23. During recording and reproduction, the head base plate 23 is advanced in the direction of the arrow A by the urging force of the spring 26 until the plate 23 contacts the pin 14a, in which case, the idler restricting portion 23g of the head base plate 23 is disengaged from the central projection 19a of the lever member 19, and the idler 18 contacts the idler pulley 11 and a reel base pulley 22 mounted on the reel spindle S2 due to the urging force of the spring 21. In addition, the pin 15b on the pinch roller arm 15 is also disengaged from the engaging portion 23f of the base plate 23, and the pinch roller 17 contacts the capstan pulley 11 due to the urging force of the spring 28, while the pin 27 on the rod of the reproduction push-button 3 is disengaged from the edge 23e of the elongated opening 23$_O$ of the base plate 23.

Referring particularly to FIG. 2, on a lower base plate 30, there is secured a shaft 29 on which a gear 31, a cam plate 32 integral with the gear 31 and having a cam face 32a, and also a lever 33 are rotatably mounted. On a shaft 36 secured to the lever 33, there are rotatably mounted a roller 34 and a gear 35 integral with the roller 34 and engaging with the gear 31, while a pin 37 is secured at one end of the lever 33, with the lever 33 being urged clockwise for contact of the roller 34 with the capstan pulley 11 by a spring 38 connected between the other end of the lever 33 and the frame of the apparatus T.

Referring also to FIG. 14 showing the construction of the take-up reel spindle S2, on a shaft 47 secured to the lower base plate 30, a take-up reel base 39 is rotatably mounted on bearings 45 and 48, and a reel base pulley 22 is externally engaged with the take-up reel base 39 through a felt member 40, with the reel base pulley 22 being urged toward the take-up reel base 39 by a coil spring 42 confined between the reel base 39 and a pulley 41 fixed to said reel base 39. Additionally, a detecting pulley 43 having a pair of engaging projections 43a and 43b (FIG. 2) is also externally fitted onto the take-up reel base 39, with a felt member 44 being disposed between the pulley 41 and the detecting pulley 43, while the detecting pulley 43 is urged toward the pulley 41 by a coil spring 46 confined between the pulley 43 and the bearing 45 secured to the take-up reel base 39. The take-up reel base 39 is provided at the upper portion thereof with a claw member 49 having a plurality of claws 49a for engagement with a corresponding opening of a hub (not shown) of a tape cartridge 111 (FIG. 1) or the like, and for simultaneous rotation with the base 39, with the claw member 49 being urged upwardly by a coil spring 50 confined between the take-up reel base 39 and the member 49.

Referring back to FIG. 2, on a shaft 52 secured to the lower base plate 30, there is pivotally mounted a detecting lever 51 having at one end thereof engaging edges 51a and 51b engageable with the engaging projections 43a and 43b of the detecting lever 43, while a shaft 51c secured on the lever 51 in a position between the shaft 52 and the engaging edges 51a and 51b is connected to one end of an actuating lever 53. The lever 51 has a counterweight 54 secured to the other end thereof to balance the detecting lever 51 and actuating lever 53 about the fixed shaft 52 for stable stopping irrespective of any difference in the attitudes of the levers 51 and 53. The actuating lever 53 has at its other end a control portion 53a, and at its central portion an elongated opening 53b in which the cam plate 32 is rotatably received and which has an engaging claw portion 53c formed at its periphery for engagement with the cam portion 32a of the cam plate 32. A lever 55 pivotally mounted on a fixed shaft 56 has an engaging portion 55a formed adjacent to its one end for engagement with an engaging edge 33a of the lever 33, while a pin 55b is secured to the other end of the lever 55. Another L-shaped lever 57 pivotally mounted on a fixed shaft 58 has formed adjacent one end thereof an engaging portion 57a engageable with the pin 55b of the lever 55 and an engaging projection 57b engageable with an engaging portion 7a on the rod of the eject push-button 7. The engaging projection 57b has a saw-tooth like groove (not shown) for positive engagement with the engaging portion 7a of the rod 7 to stop said portion 7a. The lever 57 further has adjacent to its other end engaging projections 57c, 57d and 57e respectively engageable with operating end portions 3a, 4a and 5a of the rods for the reproduction push-button 3, rewinding push-button rod 4 and fast forwarding push-button 5, and also, at its extreme end, an operating portion 57f for actuating a switch 61 to turn ON or OFF a circuit extending from a power source 112 to an audio circuit 59 including the motor 10, an amplification circuit, etc., or to a warning lamp 60 (FIG. 17). Further provided on the lever 57 are two V-shaped engaging recesses 57g and 57h engageable with the external edges 62b and 62b' of a rotation transmitting portion 62a for a supply reel base 62 for the supply reel spindle S1 as is most clearly seen in FIG. 15. The engaging recesses 57g and 57h are so arranged that there are four contact points with the external edges 62b and 62b' of the rotation transmitting portion 62a of the supply reel base 62 in one imaginary plane and so that the center of the fixed shaft 58 for the lever 57 is located in the extension of the imaginary plane. The lever 57 is urged counterclockwise by a spring 63 connected between the portion adjacent to the projection 57d of the lever 57 and a lever 83 described later, while the lever 55 is urged clockwise by the force of the spring 63 when the engaging portion 57a of the lever 57 contacts the pin 55b on the lever 55, and is urged counterclockwise about the shaft 56 by the force of the spring 38 when the engaging edge 33a of the lever 33 is in engagement with the engaging portion 55a of the lever 55. In this case, the forces of the springs 63 and 38 are so related that the lever 55 is rotated clockwise at all times. By the above arrangement, during the stopping period of the apparatus T, the roller 34 is held in a position away from the capstan pulley 11. As shown in FIG. 15, showing the construction of the supply reel spindle S1, the supply reel base 62 is provided with a claw member 64 having a plurality of driving claws 64a for engagement with a corresponding opening (not shown) in the reel hub for the tape cartridge 111 (FIG. 1), and a coil spring 65 for urging the claw member 64 upwardly, and is rotatably supported on a shaft 67 secured to the lower base plate 30 through a bearing 66, while a coil spring 68 is confined between the base plate 30 and a rotation transmitting portion 62a of the reel base 62 for imparting back tension to the supply reel base 62.

Still referring to FIG. 2, rotatably supported on a fixed shaft 70 is a lever 69 on which gears 73 and 74 in mesh with each other are rotatably mounted on shafts 71 and 72, while a pulley 75 is pressed against the gear 73 through a felt member (not shown) by a spring (not shown) for transmitting rotation of the gear 73 to the pulley 75 with a predetermined frictional torque. During the fast forwarding operation of the apparatus T, the gear 73 is engaged with the capstan gear 12, while the pulley 75 is being pressed against the pulley 41. During the rewinding operation of the apparatus T, the gear 74 is engaged with the capstant gear 12, while the pulley 75 contacts with the rotation transmitting portion 62a of the supply reel base 62 under pressure. For pressing the pulley 75 against the pulley 41 or against the rotation transmitting portion 62a of the supply reel base 62, a spring 76 is mounted on a shaft 69a secured to the lever 69, with ends 76a and 76b of the spring 76 engaged with spring engaging projections 69b and 69c on the lever 69. During the stopping period, the lever 69 is held in a stationary position, since the shaft 71 is held in position by the engaging portion 4b on the rod of the rewinding push-button 4 and the engaging portion 5b on the rod of the fast forwarding push-button 5. The rods of the rewinding push-button 4 and fast forwarding push-button 5 are respectively provided with operating portions 4c and 5c which are engageable with the ends 76a and 76b of the spring 76 mentioned above. Since the pulley 75 transmits rotation in the direction of escapement during the fast forwarding and in the direction of engagement during the rewinding, the positions of the shaft 70 on the lever 79, the shaft 69a for the spring 76, and the spring operating portions 4c and 5c on the rods of the rewinding and fast forwarding push-buttons 4 and 5 are such as to provide a large contact pressure during the fast forwarding and a small contact pressure during the rewinding. Meanwhile, a lever 77 pivotally supported on a fixed shaft 78 has, on one surface at its one end, pins 77a and 77b which are respectively engageable with the engaging portions 4d and 5d on the rods of the rewinding push-button 4 and fast forwarding push-button 5, while on the other surface of the said one end, a pin 77c is secured. On the other end of the lever 77, there is provided an engaging portion 77d which is engageable with a pin 23h extending downwardly from one surface of the head base plate 23. The lever 77 is urged clockwise by a spring 79 connected between a portion adjacent to the projection 77a on the lever 77 and the frame of the apparatus T. On a fixed shaft 81 at the left hand side of FIG. 2, there is pivotally mounted on a lever 80 which has at one end thereof an engaging portion 80a engageable with the pin 23h on the head base plate 23 and at the other end thereof another engaging portion 80b engageable with an operating portion 1a on the rod of the temporary stopping push-button 1. The lever 80 is urged counterclockwise by a spring 82 connected between a portion of the lever 80 adjacent to the engaging portion 80b and a guide member 30a described later, and is held in the stopping position during the stopping period. A lever 83 pivotally mounted on a fixed shaft 84 at a position adjacent to the lever 80 has, at its one end, an engaging portion 83a engageable with the pin 37 secured to the lever 33, and at its other end a pin 83b, and also adjacent to the shaft 84, an engaging portion 83c. The lever 83 is urged clockwise by the spring 63 described earlier and connected between the lever 83 and the lever 57, while the pin 83b of the lever 83 is engageable with the engaging opening 3b in the rod of the reproduction push-button 3, with the engaging portion 83c of the lever 83 engaging the pin 77c on the lever 77. The lever 83 is also urged counterclockwise by the spring 79, and when the engaging portion 83a thereof is in engagement with the pin 37 on the lever 33, is also urged counterclockwise by the spring 38 for the lever 33, but the relationship is such that the clockwise urging force of the spring 63 is larger than the counterclockwise urging force of the springs 79 and 38. In the stopping period, however, since the pin 83b on the lever 83 engages an opening 3b in the rod of the reproduction push-button 3 and the counterclockwise urging force of a return spring 85 for the rod of the reproduction push-button 3 is larger than the clockwise urging force of the spring 63, the lever 83 is held in position, restricted by the stopping position of the rod of the reproduction push-button 3. In a direction parallel to the row of the push-buttons 1 to 8, there is provided a clock rod 86 which is slidably guided in the directions indicated by the arrows C and E, and D and F (FIG. 16) along guide member 30a integral with the lower base plate 30. As is most clearly seen from FIG. 16, the lock rod 86 has, at its upper base plate side, engaging projections 86a, 86b, 86c, 86d, 86e, 86f and 86g, and at its lower base plate side, an engaging projection 86h, and is urged in the directions of the arrows C and D by the urging force of a spring member 87 supported of the lower base plate 30.

During the stopping period, one end 86i of the lock rod 86 contacts the engaging portion 30b of the lower base plate 30, while the engaging projections 86b and 86f of the lock rod 86 are retained in positions in contact with the upper base plate 14. The rods for the recording, reproduction, rewinding and fast forwarding push-buttons 2, 3, 4 and 5 respectively have engaging portions 2a, 3c, 4e and 5e (FIG. 2) which are engageable with the engaging projections 86b, 86c, 86a and 86e of the lock rod 86 by a conventionally known locking mechanism (not shown). It is to be noted that, when the rod of the rewinding push-button 4 or the fast forwarding push-button rod 5 is locked, the lock rod 86 is positioned in the same state as in the stopping period with respect to the directions of the arrows C and E, with the end 86i thereof engaging the portion 30b of the lower base plate 30, while when the rod of the recording push-button 2 or the reproduction push-button rod 3 is locked, the lock rod 86 is located, with respect to the directions of the arrows C and E, in a position shifted in the direction of the arrow E as compared with the position thereof during the stopping period, so that even if the rewinding push-button 4 or fast forwarding push-button 5 is pushed inward at such time, the lock rod 86 does not move in the direction of the arrow E. It should be noted here however, that rod of the rewinding push-button 4 and fast forwarding push-button 5 are respectively provided with operating projections 4f and 5f projecting toward the lock rod 86, and that when the rewinding push-button 4 or fast forwarding push-button 5 is pushed inward, the projection 4f or 5f depresses the operating portion 86j or 86k of the lock rod 86, so that the lock rod 86 is pressed down in the direction of the arrow F about a guide wall 30c on the lower base plate 30. In this case, since the distance the engaging projection 86b of the lock rod 86 projects is less than the projections 86c, 86d or 86e, project the engagement thereof with the engaging recess 2a in the rod of the recording push-button 2 is released. The rod for the stopping push-button 6 is provided with an operating opening 6a which is engageable with the engaging projection 86f (FIG. 16) of the lock rod 86. Meanwhile, a lever 88 pivotally and slidably mounted in a guide opening 88a on a fixed shaft 89 at the right hand side in FIG. 2 has, adjacent to its one end, a pin 88b engageable with the operating portion 53a of the lever 53, and at a distal portion of said one end, an engaging portion 88c engageable with an engaging portion 30d which is formed in the lower base plate 30 and another engaging portion 88d engageable with the engaging projection 86h (FIG. 16) of the lock rod 86. On the other hand, at the other end of the lever 88, there are provided a pin 88e and an engaging portion 88f which is engageable with the operating portion 8a of the rod for the automatic stopping changeover button 8, with the lever 88 being urged clockwise and toward right in FIG. 2 by a spring 90 connected between the lever 88 and the frame of the apparatus T. The guide opening 88a in the lever 88 is provided with a recess 88g engageable with a fixed shaft 89. During the stopping period, the lever 88 is held in the stopping position by the engagement thereof with the engaging portions 30d and 30e of the lower base plate 30. A lever 91 pivotally mounted on a fixed shaft 92 at a position adjacent to the lever 88 is provided at its one end with an engaging portion 91a engageable with the pin 88e of the lever 88 and at the other end thereof with an operating portion 91b which can depress an actuator 93a of a microswitch 93 secured to the lower base plate 30 at a position close to the portion 91b of the lever 91. The lever 91 is urged counterclockwise by a spring 94 and held in the stopping position during the stopping period.

Referring also to FIG. 17, the C terminal 93b of the microswitch 93 is connected to the power source 112, and the NO terminal 93c thereof to the lamp 60, while the NC terminal 93d thereof is coupled to the parallel connected motor 10 and audio circuit 59.

Figure 3:
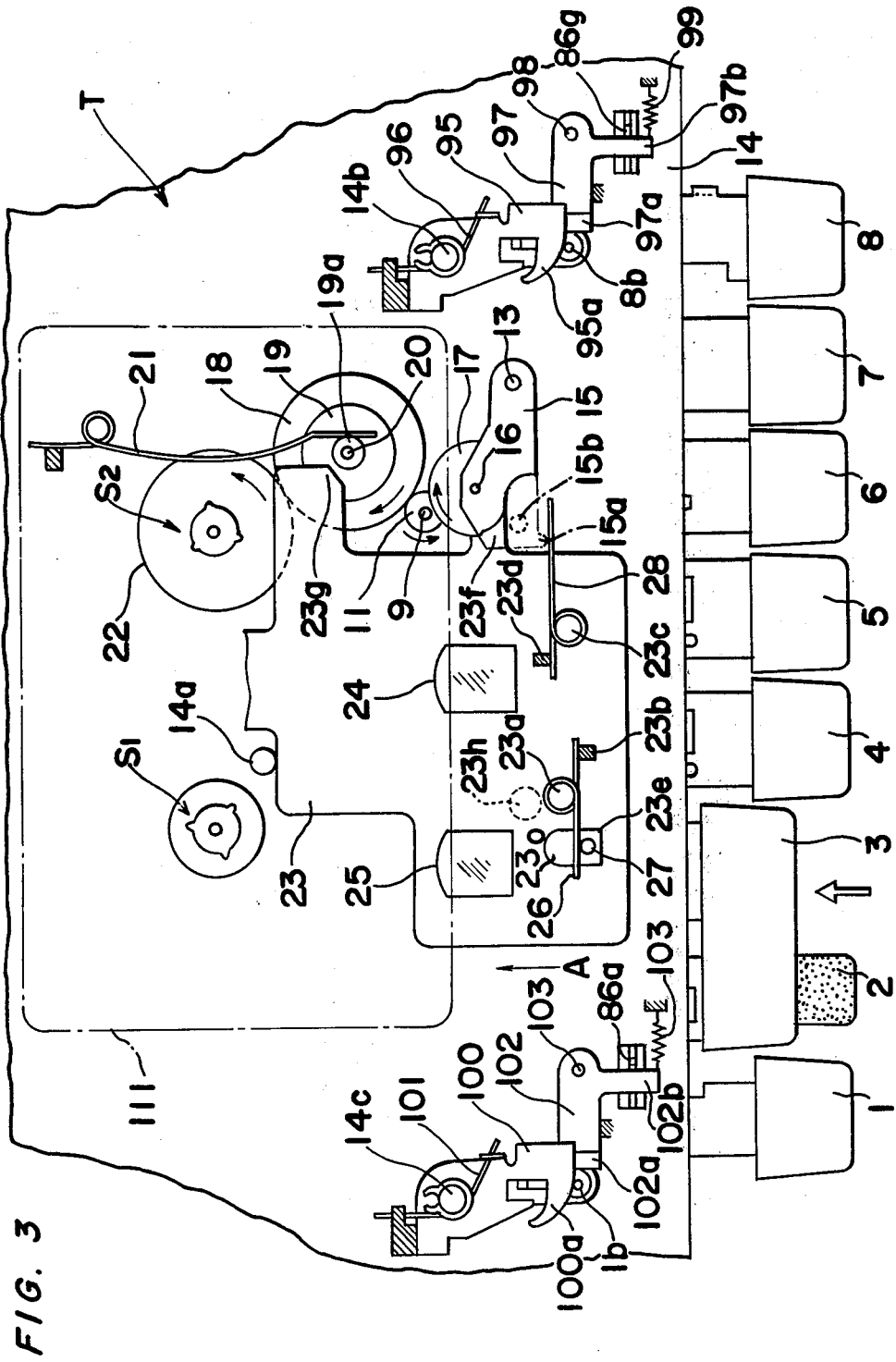
FIGS. 3 and 4 are views similar to FIGS. 1 and 2, but particularly show the magnetic tape recording and reproduction apparatus in a condition for reproduction.

On a pin 14b (FIG. 1) secured to the upper base plate 14, there is pivotally mounted a lock plate 95 (FIGS. 1, 3, 7 and 9) which has, at its one end, an engaging portion 95a able to lock the lock pin 8b secured to the automatic stopping change-over push-button 8, and which is urged clockwise and toward the upper base plate 14 by a spring 96, thus forming the conventional so-called push-push type lock mechanism. Pivotally mounted on a fixed shaft 98 (FIGS. 1, 3, 7 and 9) in a position adjacent to the plate 95 is a lever 97 having at its one end an operating portion 97a with an inclined surface thereon which engages the surface of the lock plate 95 on the side toward the upper base plate 14 for causing, during rotation of an inclined surface on the lever 97, the lock plate 95 to be moved in the direction of its thickness, and also having at the other end thereof, an engaging portion 97b engageable with the engaging projection 86g of the lock rod 86, and the lever 97 is urged counterclockwise by a spring 99. At the left hand side of the apparatus T in FIG. 3, a lock plate 100 is pivotally connected to a pin 14c secured to the upper base plate 14 for constituting a conventional push-push type lock mechanism similar to the lock plate 95 mentioned earlier. The lock plate 100 has, at its one end, an engaging portion 100a which can lock a lock pin 1b which is secured to the rod for the temporary stopping push-button 1, and is urged clockwise and also toward the upper base plate 14 by a spring 101. Associated with the lock plate 100 is a lever 102 having a similar function to the lever 97 described earlier and pivotally supported on a fixed shaft 103. The lever 102 is provided at its one end with an operating portion 102a having an inclined surface, and at the other end, with an engaging portion 102b engageable with the engaging projection 86a of the lock rod 86, and is urged counterclockwise by a spring 103.

As is seen from FIG. 2, the rod for the temporary stopping, recording, rewinding, fast forwarding, stopping, eject, and automatic stopping change-over buttons 1 to 8 are respectively urged to the stopping positions by return springs 104, 105, 106, 107, 108, 109 and 110. The upper base plate 14 is integrally connected with the lower base plate 30. The conventional cartridge or cassette 111 shown by the chain line in FIG. 1 has two reel hubs (not shown) and magnetic tape (not shown) stored on the reel hubs.

With the parts in the above arrangement, the operation of the apparatus T will be described hereinbelow.

Figure 4:
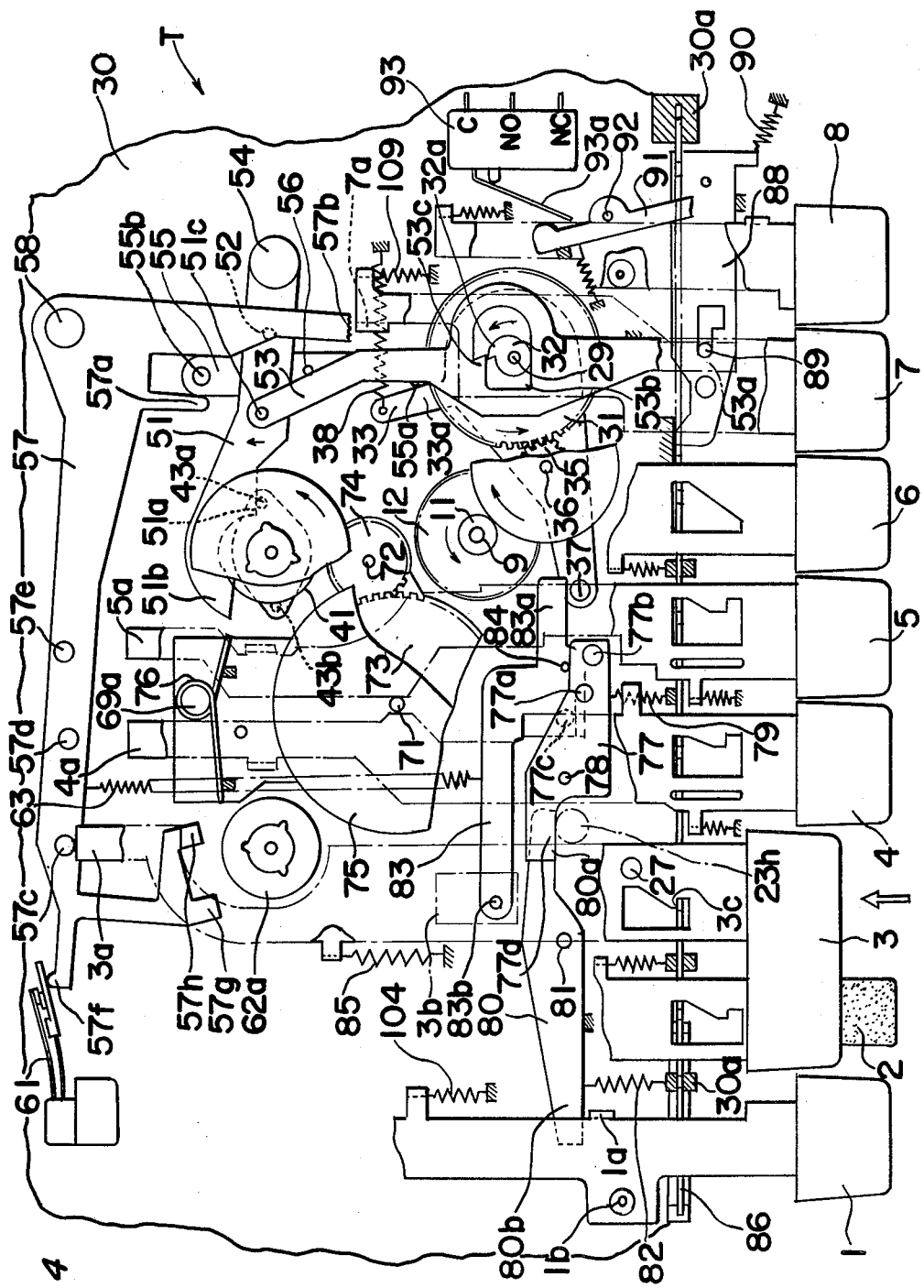

In the first place, the actions of the parts during tape reproduction will be explained. When the reproduction push-button 3 is depressed when the apparatus is in the shut down state shown in FIGS. 1 and 2, the pin 27 on the rod for the push-button 3 advances in the direction of the arrow A as in FIGS. 3 and 4, and the head base plate 23 is moved forward by the resistance of the spring 26 to movement of pin 27. At this time the central projection 19a of the lever member 19 is freed from the idler restricting portion 23g of the head base plate 23, and the idler 18 contacts, due to the urging force of the spring 21, the capstan pulley 11 and reel base pulley 22 with a predetermined degree of pressure. Additionally, the pinch roller arm 15 is rotated clockwise about the shaft 13 by the force of the spring 28, and when the pinch roller 17 contacts the capstan 9 under pressure, the pin 15b on the pinch roller arm 15 is freed from the engaging portion 23f of the head base plate 23 for application of a predetermined pressure to arm 15 by spring 28. The head base plate 23 is held in the position for reproduction by the contact thereof with the pin 14a on the upper base plate 14 when the head base plate has advanced a predetermined amount. The reproduction push-button 3 can be further pressed inward after the head base plate 23 has contacted the pin 14a, and is held in a locked position when the engaging portion 3c of the rod for the push-button 3 engages the engaging recess 86c of the lock rod 86, with the pin 27 being spaced from the edge 23e of the opening 23$_0$ in the head base plate 23. On the other hand, the operating portion 3a at the forward end of the rod for the reproduction push-button 3 is advanced into engagement with the engaging projection 57c on the lever 57, and therefore, the lever 57 is rotated clockwise about the fixed shaft 58 against the force of the spring 63. By the above operation, the engaging recesses 57g and 57h of the lever 57 are spaced from the peripheral edges 62b and 62b' of the supply reel 62, and thus the only force opposing the rotation of the supply reel 62 is the back tension of a predetermined degree exerted by the spring 68 (FIG. 15). At this time, since the engaging portion 57a of the lever 57 moves away from the pin 55b on the lever 55, the lever 55 forced in the clockwise direction, and thus, the lever 33 is rotated clockwise about the shaft 29 by the force of the spring 38, and the roller 34 engages the capstan pulley 11 with a predetermined pressure. Simultaneously, the lever 83 no longer blocked by engagement of the pin 83b therein in the engaging opening 3b in the rod of the reproduction push-button 3 is rotated clockwise about the fixed shaft 84 by the force of the spring 63, and the engaging portion 83a of the lever 83 engages the pin 37 on the lever 33 to prevent the roller 34 from contacting the capstan pulley 11 under pressure. At this time, since the engaging portion 83c of the lever 83 is in engagement with the pin 77c on the lever 77, the lever 77 tends to rotate counterclockwise about the fixed shaft 78. In the above case, however, since the pin 23h secured to the head base plate 23 has been advanced by the advancing of the rod of the reproduction push-button 3 and the advancing force of the head base plate 23 is much larger than the counterclockwise rotational force of the lever 77 after the pin 23h has engaged the engaging portion 77d of the lever 77, the lever 77 is actually rotated clockwise, an the lever 83 is also rotated counterclockwise. By the above operation, so that the pin 37 on the lever 33 is freed from the engaging portion 83a of the lever 83, and the roller 34 contacts the capstan pulley 11 under pressure. At the same time, the distal operating portion 57f of the lever 57 closes the switch 61 (FIG. 17) to turn the power source for the audio circuit 59 ON (FIG. 17). When the motor 10 starts rotating upon turning ON of a switch 113 (FIG. 17), the capstan 9 rotates counterclockwise for driving the magnetic tape (not shown) at a constant speed in cooperation with the pinch roller 17, while the take-up reel base 39 is rotated counterclockwise by the capstan pulley 11, idler 18, and reel base pulley 22 for winding the magnetic tape thereonto. In the above case, since the engaging projection 57b on the lever 57 is located at a position in the path of advance of the engaging portion 7a of the rod for the eject push-button 7, further advancing of the rod is prevented by the engagement of the engaging portion 7a with the engaging projection 57b, even if the push-button 7 is depressed, and the tape cartridge 111 is not moved from the predetermined position, whereby stable running of the magnetic tape is ensured.

In the case of recording, the rods for the recording push-button 2 and for the reproduction push-button 3 are locked simultaneously, and the magnetic tape is caused to run in a similar manner to that for the reproduction.

The functioning of the apparatus in the case of a fast forwarding operation will now be described. Upon depression of the fast forwarding push-button 5, the shaft 71 on the lever 69 is freed from engagement with the engaging portion 5b of the rod for the push-button 5, and when the spring operating portion 5c contacts the end 76b of the spring 76, the lever 69 is rotated counterclockwise about the fixed shaft 70. By this movement, the gear 73 is caused to engage the capstan gear 12, and upon contact of the pulley 75 with the pulley 41, the end 76b of the spring 76 moves away from the spring engaging projection 69c on the lever 69, and thus the pulley 75 contacts the pulley 41 with a predetermined force. Meanwhile, the operating portion 5a of the rod for push-button 5 engages the engaging projection 57e on the lever 57 for depressing the latter, and thus the lever 57 functions in a similar manner as in the reproduction operation. On the other hand, the engaging portion 5d of the rod for push-button 5 engages the pin 77b on the lever 77 to rotate the lever 77 counterclockwise about the shaft 78, but because there is no engagement of the pin 23h secured to the head base plate 23 with the lever 83, the movement of the lever 77 is an idle movement, not affecting other operations, and thus the engaging portion 5e of the rod for push-button 5 engages the engaging projection 86e on the lock rod 86 so as to be locked in the locked position. Thus, the take-up reel base 39 is driven counterclockwise through the capstan 9, capstan gear 12, gear 73, pulley 75 and pulley 41 to take up the magnetic tape.

The functioning of the apparatus rewinding will be described hereinbelow. Upon depression of the rewinding push-button 4, the shaft 71 is released from the engaging portion 4b, and when the spring operating portion 4c of the rod for push-button 4 contacts the end 76a of the spring 76, the lever 69 is rotated clockwise about the fixed shaft 70. As a result of this movement, the gear 74 engages the capstan gear 12, and when the pulley 75 contacts the rotation transmitting portion 62a of the supply reel base 62, the end 76a of the spring 76 moves away from the spring engaging projection 69b on the lever 69, so that the pulley 75 contacts the rotation transmitting portion 62a with a predetermined force. In this case, since the distal operating portion 4a of the rod for the push-button 4 engages the engaging projection 57d of the lever 57 for depressing the latter, the lever 57 functions in a similar manner to the functioning during reproduction. Although the engaging portion 4d of the rod for push-button 4 engages the pin 77a on the lever 77 and causes the lever 77 to rotate counterclockwise about the fixed shaft 78, this rotation is idle movement as in the case of the fast forwarding. Meanwhile, the engaging portion 4e of the rod for push-button 4 engages the engaging projection 86d on the lock rod 86 so as to be locked in the locked position. Thus, the supply reel base 62 is driven clockwise through the capstan 9, capstan gear 12, gear 74, gear 73 and pulley 75 to wind the magnetic tape thereonto.

Figure 5:
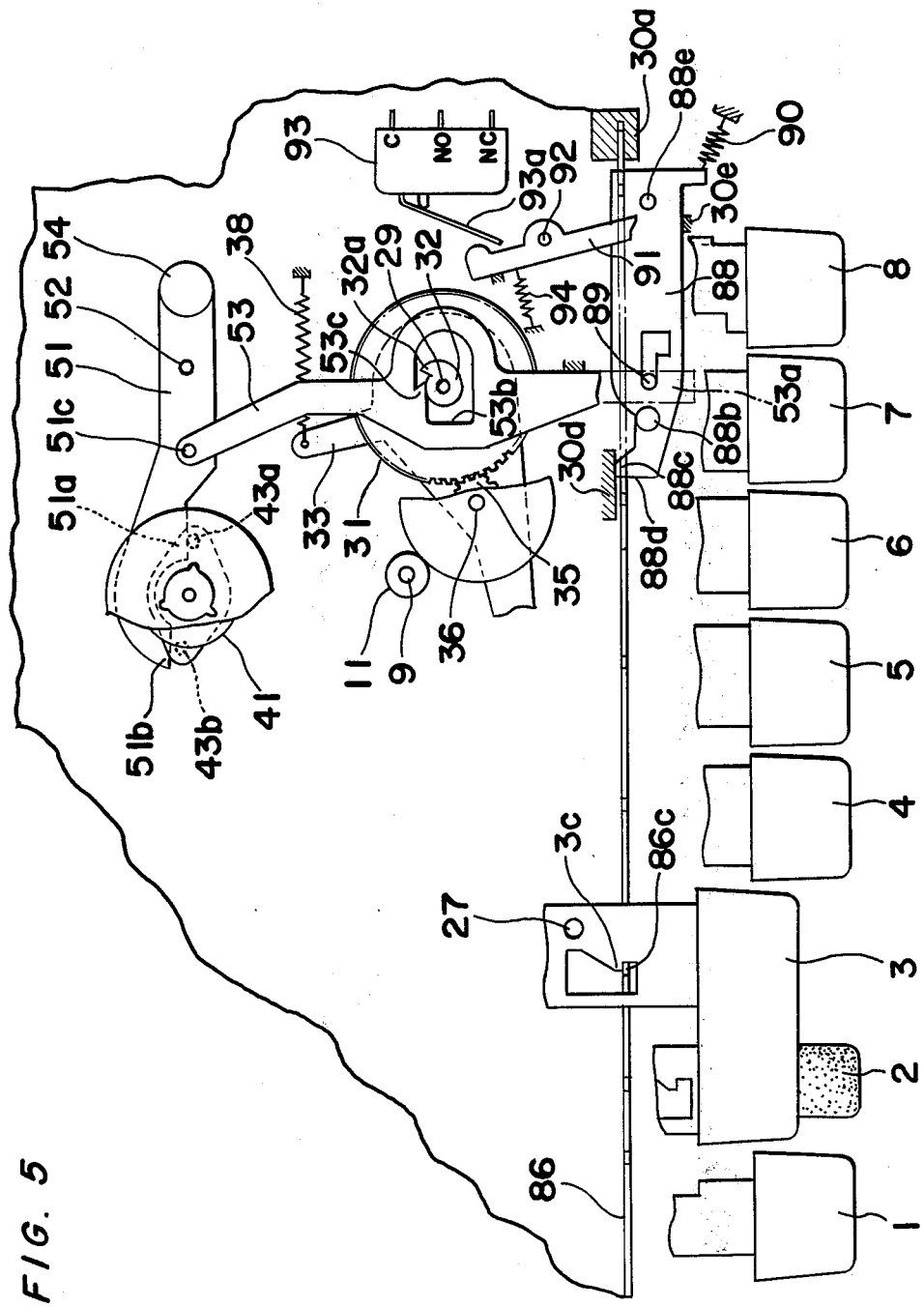
FIGS. 5 and 6 are views similar to FIGS. 1 and 2, but particularly show the conditions before and after functioning of the tape running and stopping detection device employed in the apparatus of FIGS. 1 and 2, FIGS. 7 and 8 are views similar to FIGS. 1 and 2, but particularly show the magnetic tape recording and reproducing apparatus when it is temporarily stopped.
Figure 6:
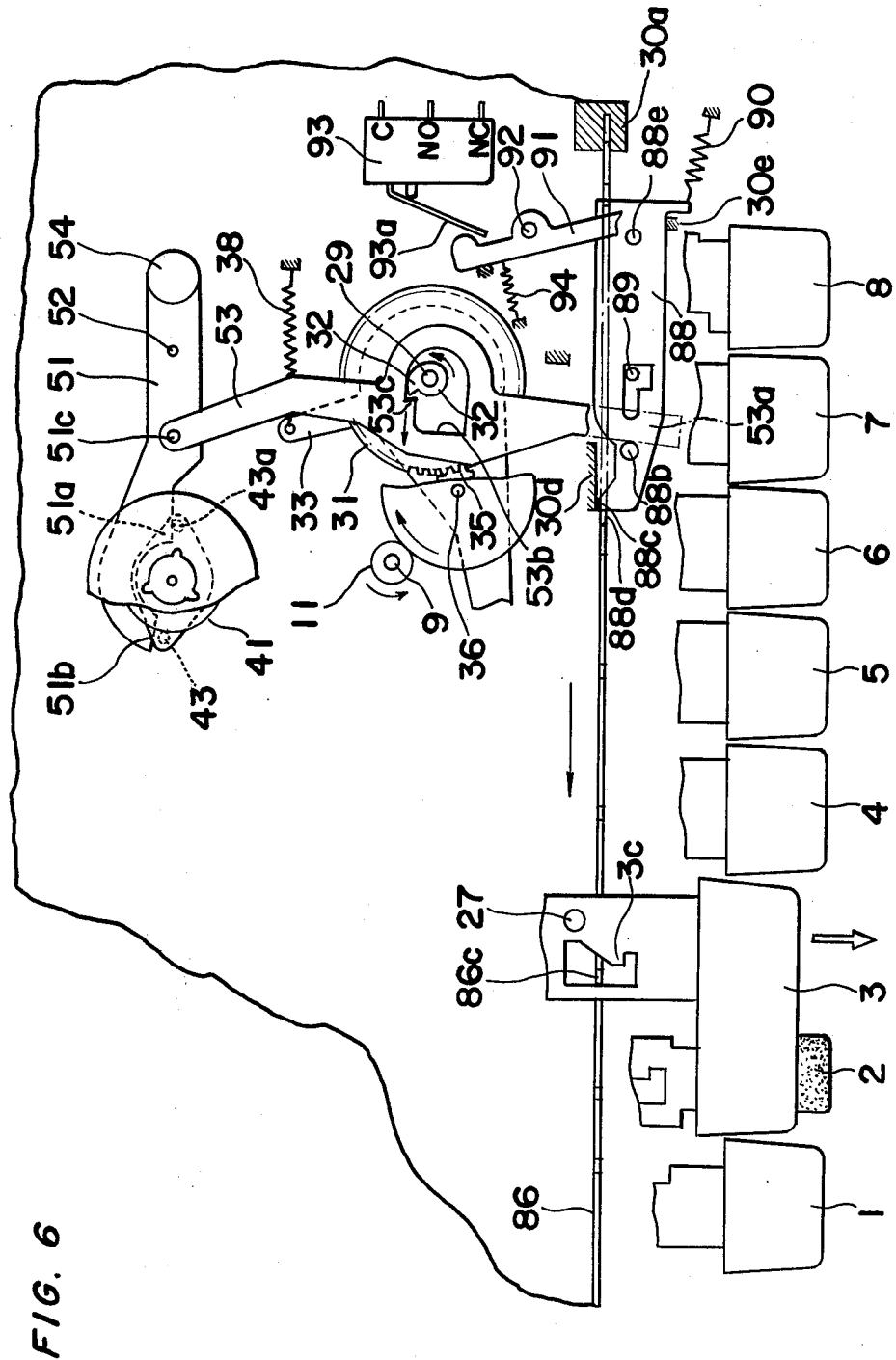

The functioning of the magnetic tape running and stopping dection device will now be described hereinbelow with reference to FIGS. 5, 6 and 14.

During running of the magnetic tape for reproduction, recording, fast forwarding or rewinding, the cam plate 32 is driven counterclockwise by the pressure contact of the roller 34 with the capstan pulley 11. Meanwhile, the detection pulley 43 is driven by the pulley 41 through the felt member 44 (FIG. 14) with a predetermined frictional torque, and is urged counterclockwise about the supporting shaft 47 (FIG. 14) during reproduction, recording and fast forwarding, and clockwise during rewinding. By the above operation, since the engaging projections 43a and 43b on the detection pulley 43 respectively engage the engaging edges 51a and 51b of the detecting lever 51, the detecting lever 51 is normally urged clockwise about the fixed shaft 52, and consequently, the actuating lever 53 is pulled upwardly in FIG. 2, with the opening 53b thereof contacting the under side of the cam plate 32 under pressure. Accordingly, the cam plate 32 continues to rotate counterclockwise about the shaft 29 within the opening 53b in the lever 53, with the cam portion 32a of the cam plate 32 not engaging the engaging claw portion 53c in the opening 53b of the actuating lever 53. More specifically, in the above case, the cam portion 32a of the cam plate 32, during rotation thereof in the opening 53b, depresses the lever 53 against the force of detection pulley 43 on the lever 53 due to the friction torque mentioned earlier, but after the cam portion 32a has passed, the actuating lever 53 is again raised upwardly by the friction torque, and the cam portion 32a rotate continuously as described earlier. When the tape is stopped, the take-up reel base 39 stops rotating, and the friction torque is not longer transmitted to the detection pulley 43, and thus, the detecting pulley 43 and detecting lever 51 stop rotating and the actuating lever 53 becomes stationary, moved downwardly in FIG. 5 by the cam portion 32a. In this case, since the cam portion 32a of the cam plate 32 then engages the engaging claw portion 53c of the lever 53 to move the latter, the actuating lever 53 is rotated counterclockwise about the shaft 51c for engagement of its operating portion 53a with the pin 88b on the lever 88 to actuate the lever 88, the lever 88 being displaced toward the left in FIG. 5. When the lever 88 is shifted to the left, as seen in FIG. 6, at the same time it moves, with its engaging portion 88d, the engaging projection 86h on the lock rod 86. Therefore, the lock rod 86 is shifted to the left in FIG. 6 to release the locking of each of the rods for the push-button 1 to 8. By the above operation, each of the push-buttons 1 to 8 is returned to the initial inoperative positions shown in FIGS. 1 and 2 and retained thereat. Consequently, lever 57 is at the same time urged counterclockwise by the spring 63, the switch 61 thus being turned OFF, while the actuating lever 53, lever 88 and lock rod 86 are returned to the initial positions, and the roller 34 is released from the pressure contact thereof with the capstan pulley 11. Simultaneously, since the V-shaped engaging recesses 57g and 57h of the lever 57 engage the peripheral edges 62b of the rotation transmitting portion 62a of the supply reel base 62 under pressure to hold the portion 62a therebetween, a predetermined rotational load is imparted to the supply reel base 62 by a wedge action to brake the supply reel base. Additionally, since the engaging projection 57b of the lever 57 moves to a position out of the path of advance of the engaging portion 7a of the rod for the eject push-button 7, the eject push-button 7 can be depressed, thus making it possible to remove the tape cartridge from the apparatus in the usual manner.

Figure 7:
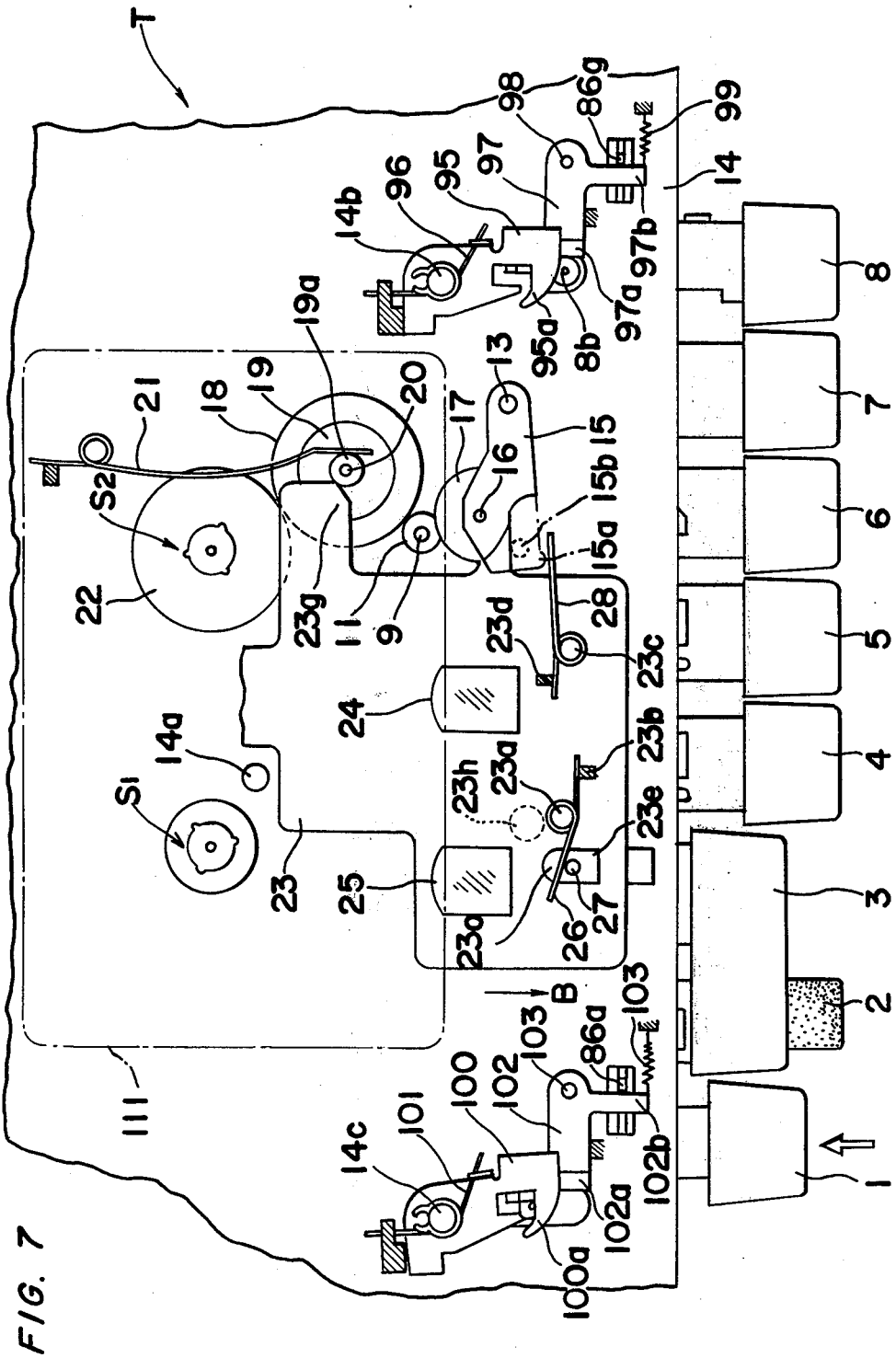
Figure 8:
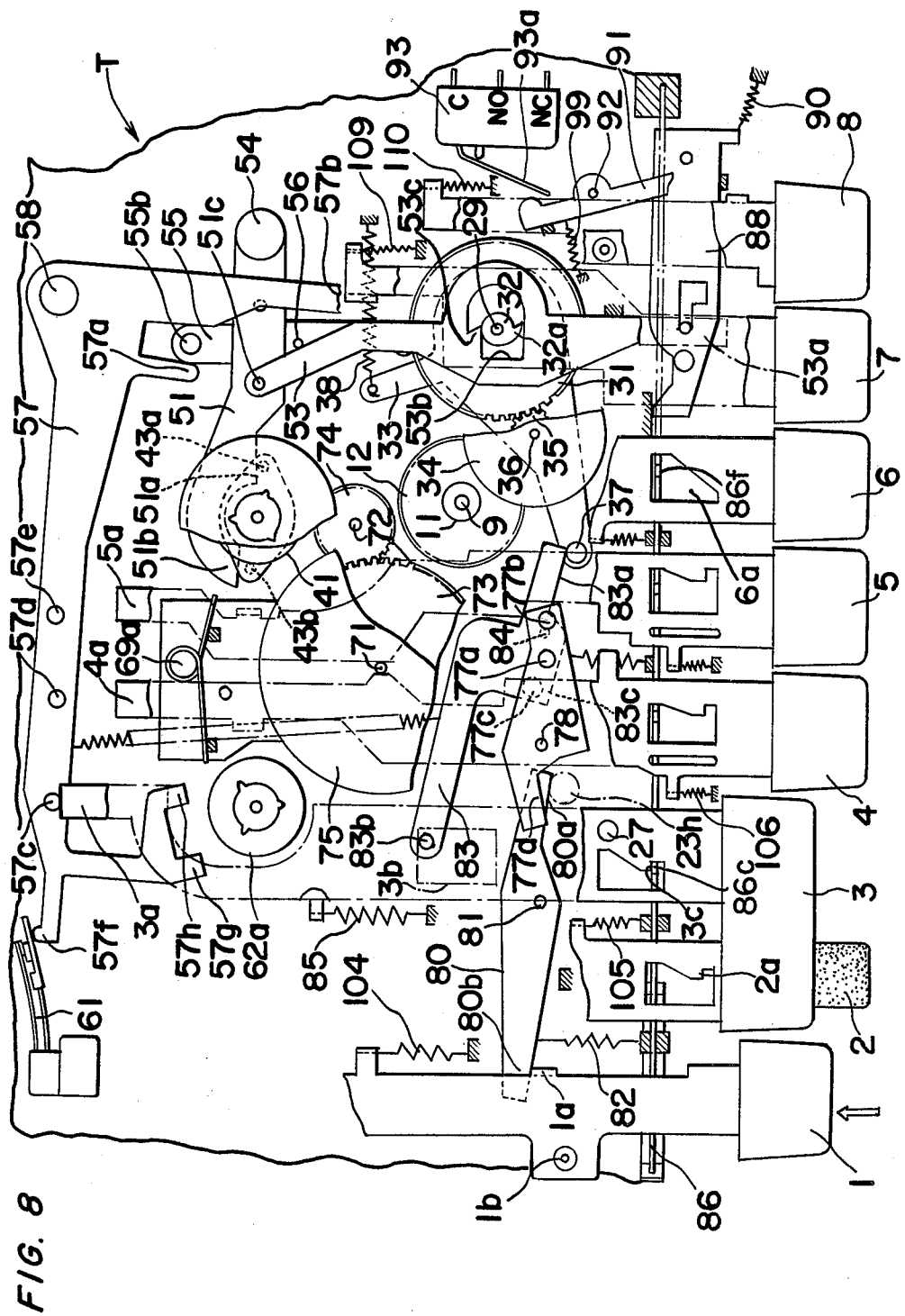

Referring also to FIGS. 7 and 8, the functioning of the parts for temporary stopping during reproduction (or recording) will be described hereinbelow.

When the temporary stopping push-button 1 is depressed during reproduction, the operating portion 1a of the rod for the push-button 1 engages the engaging portion 80b of the lever 80, and the lever 80 is rotated clockwise about the fixed shaft 81 and engaging portion 80a thereof presses the pin 23h secured to the head base plate 23, with consequent retraction of the base plate 23 in the direction of the arrow B. By the movement of the engaging portion 23f of the plate 23 engages the pin 15b of the pinch roller arm 15 to rotate the pinch roller arm 15 counterclockwise about the shaft 13 and the pinch roller 17 is moved away from the capstan 9, and the driving of the magnetic tape is interrupted. Simultaneously, the idler restricting portion 23g engages the central projection 19a of the lever member 19 and moves the lever member 19 to the right in FIGS. 7 and 8, so that the idler 18 moves away from the capstan pulley 11 and reel base pulley 22. Accordingly, the reel base pulley 22 stops rotating and the take-up reel base 39 does not wind the magnetic tape thereonto, so that the movement of the magnetic tape is stopped. In this state, if the roller 34 contacts the capstan pulley 11 under pressure, the tape running and stopping detecting device will be actuated for automatic returning to the stopped state. However, when the temporary stopping push-button 1 is operated, the pin 23h on the head base plate 23 is retracted in the direction of the arrow B, and therefore, the lever 77 is rotated counterclockwise by the force of the spring 63 following the retraction of the pin 23h, with simultaneous clockwise rotation of the lever 83. Since the rod for the reproduction push-button 3 is held in the locked position, the lever 83 is rotated until the pin 83b thereon contacts the engaging opening 3b in the rod for the reproduction push-button 3 and is retained thereat. At this point, the engaging portion 83a of the lever 83 engages the pin 37 of the lever 33 to press the pin 37 downwardly in FIGS. 7 and 8, and thus, the lever 33 is rotated counterclockwise about the shaft 29. Accordingly, the roller 34 leaves the capstan pulley 11, and the rotation thereof is interrupted. By this operation, the rotation of the cam portion 32a is stopped to prevent the automatic stopping as described earlier. It is to be noted that the time of the separation of the roller 34 from the capstan pulley 11 is arranged to be earlier than the time of stopping of the magnetic tape for preventing malfunction. The rod for the temporary stopping push-button 1 is locked to the lock plate 100 so as to be retained in the operating position by the known push-button lock mechanism.

With the parts in the, when the stopping push-button 6 is depressed from its position at the time of temporary stopping, the engaging projection 86f on the lock rod 86 is pressed by the edge of the operating opening 6a in the rod 6, with consequent displacement of the lock rod 86 to the left in FIGS. 7 and 8, while the engaging projection 86c on the rod 86 is disengaged from the engaging portion 3c, and the reproduction push-button 3 is returned to the inoperative position by the action of the return spring 85. Simultaneously, since the engaging projection 86a on the lock rod 86 engages the engaging portion 102b of the lever 102 to move the latter, the lever 102 is rotated clockwise about the fixed shaft 103, with the inclined surface of the operating portion 102a rotating the lock plate 100 in the direction of its thickness, and thus the engaging portion 100a is disengaged from the lock pin 1b, and the rod for the temporary stopping push-button 1 is returned to the inoperative position by the action of the return spring 104.

Figure 9:
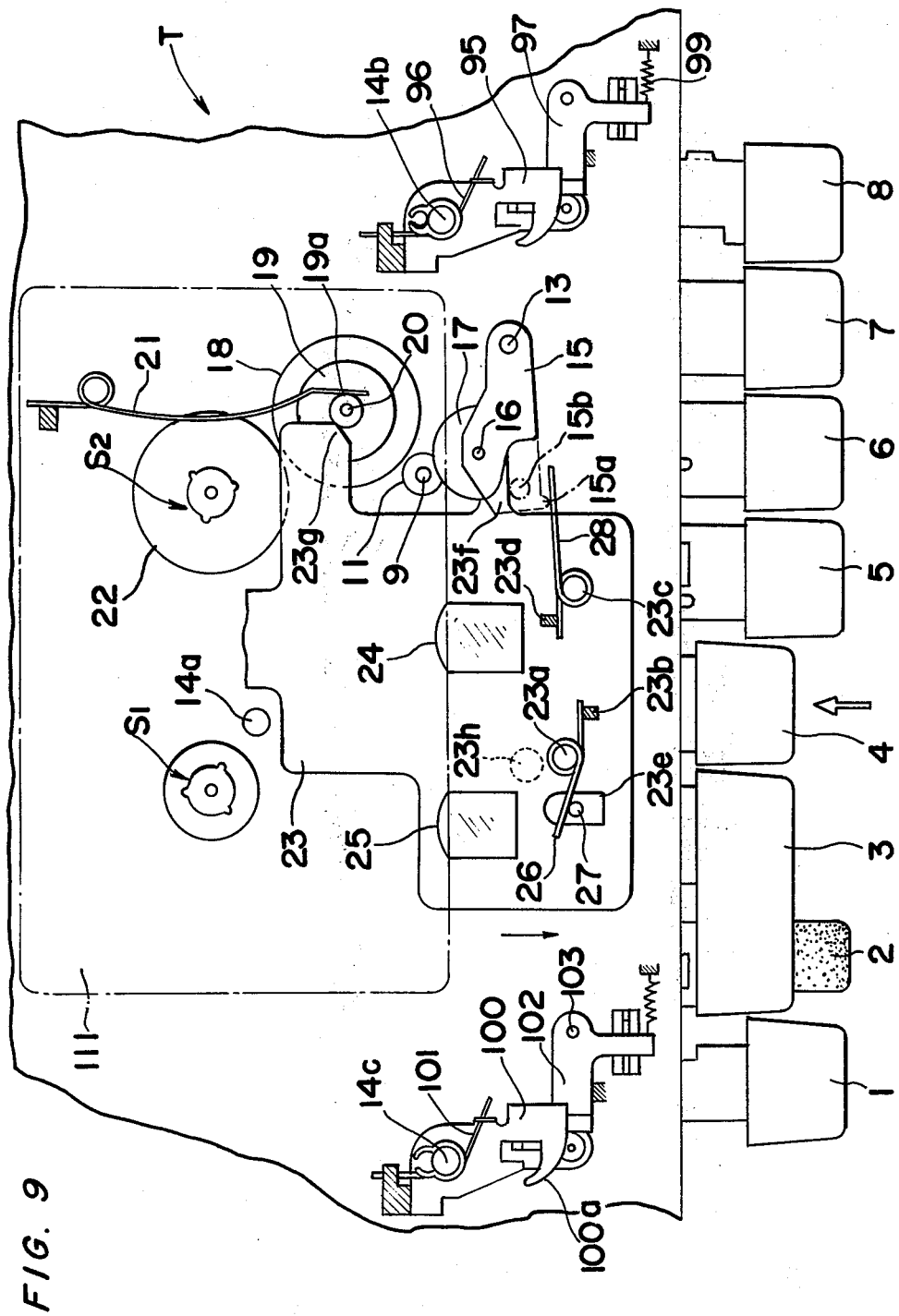
FIGS. 9 and 10 are views similar to FIGS. 1 and 2, but particularly show the magnetic tape recording and reproducing apparatus functioning in a review operation.
Figure 10:
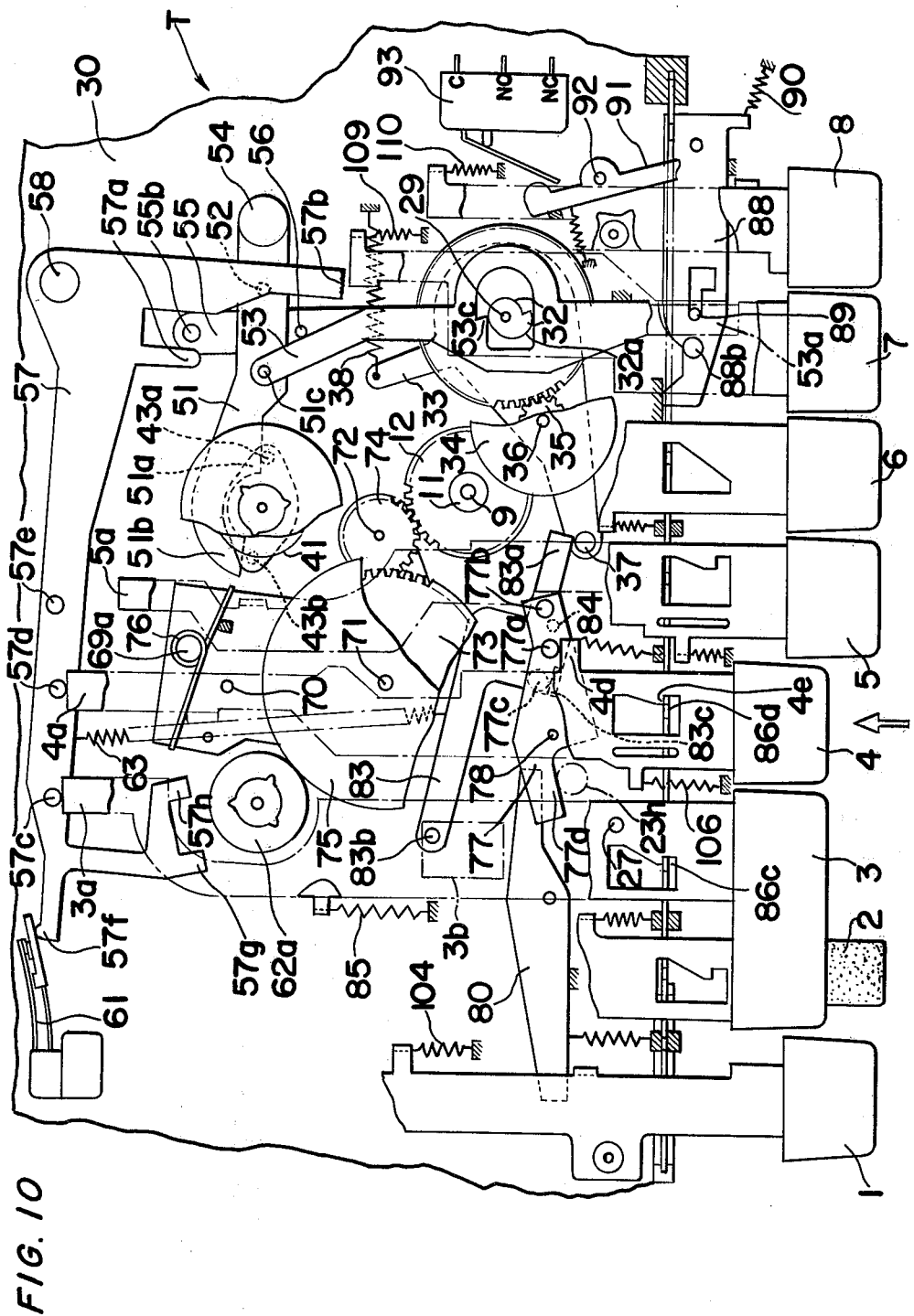

The "review" operation of the "cue" and "review" operations will be described hereinbelow with reference to FIGS. 9 and 10.

When the rewinding push-button 4 is depressed during the reproduction operation, the engaging portion 4d on the rod for the push-button 4 contacts the pin 77a on the lever 77 to move the latter, and the lever 77 is rotated counterclockwise about the fixed shaft 78. Accordingly, the engaging portion 77d on the lever 77 contacts and moves the pin 23h secured to the head base plate 23, with consequent retraction of the head base plate 23 in the direction of the arrow B in a manner similar to the movement during a temporary stopping operation. After the head base plate 23 has been retracted to a position at which the magnetic tape stops running, the "review" state is established by the carrying out of the rewinding function described earlier, but with the apparatus in this state, if the magnetic tape is stopped and rewinding has not started, the tape running and stopping detection device described earlier would normally be actuated for automatic shut down of the apparatus T when the roller 34 is in engagement with the capstan pulley 11. It is to be noted, however, that in the "review" operation, since the lever 77 is rotated counterclockwise, the lever 83 is rotated clockwise in a manner similar to its rotation for the temporary stop function, with the engaging portion 83a thereof engaging the pin 37 for moving the latter downwardly in FIGS. 9 and 10, and thus the lever 33 is rotated counterclockwise about the shaft 29. Accordingly, the roller 34 leaves the capstan pulley 11 and stops rotating so that automatic stopping does not take place. In this case, the engaging portion 4e on the rod for the rewinding push-button 4 does not engage the engaging projection 86d on the lock rod 86, so that the rod for the rewinding push-button 4 remains unlocked, and the rod for the rewinding push-button 3 is not released from its locked condition.

Figure 11:
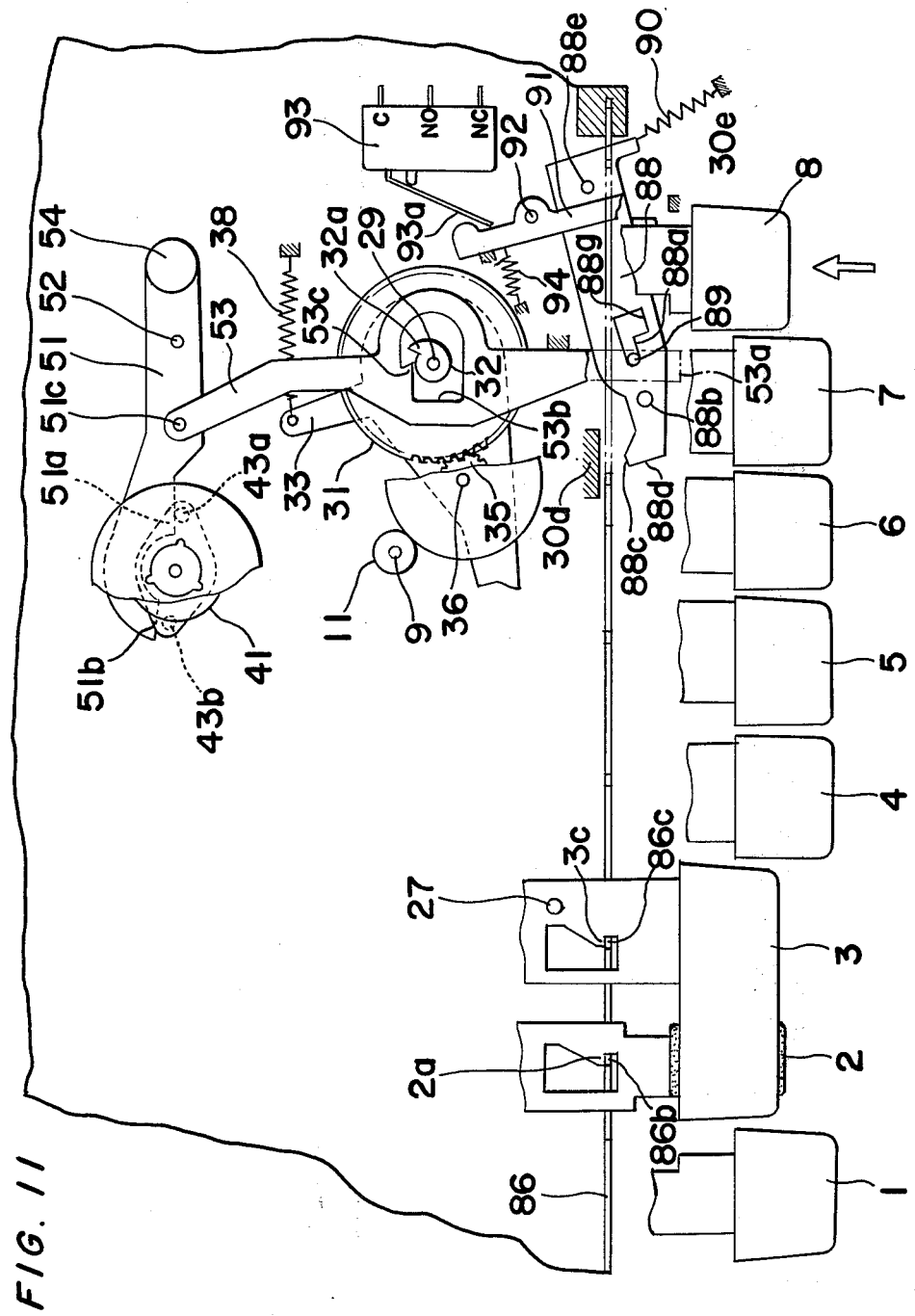
FIGS. 11 and 12 are views similar to FIGS. 5 and 6, but particularly show the conditions before and after functioning of the tape running and stopping detection device during automatic stopping and change over of the apparatus of FIGS. 1 and 2.
Figure 12:
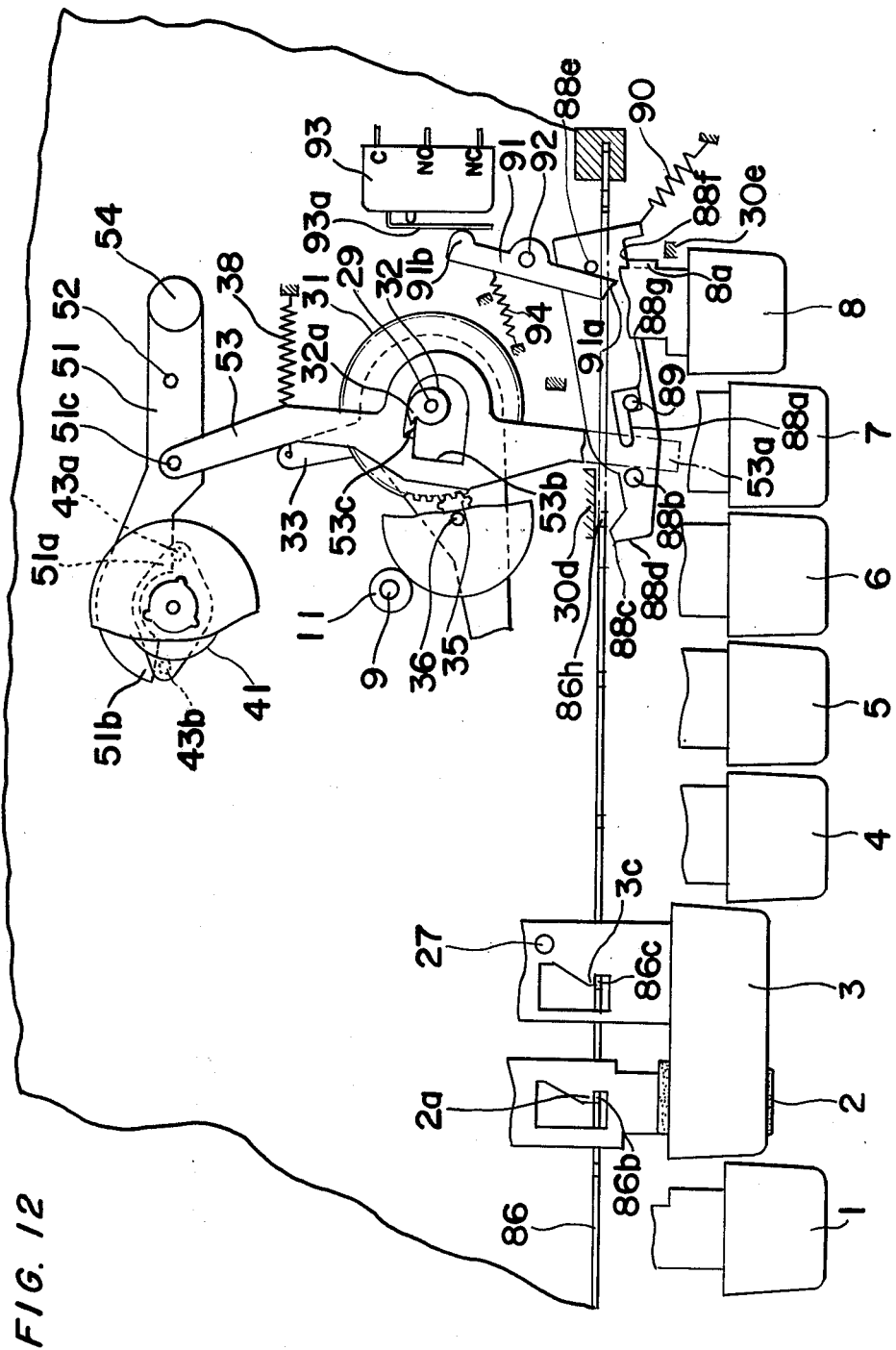
Figure 13:
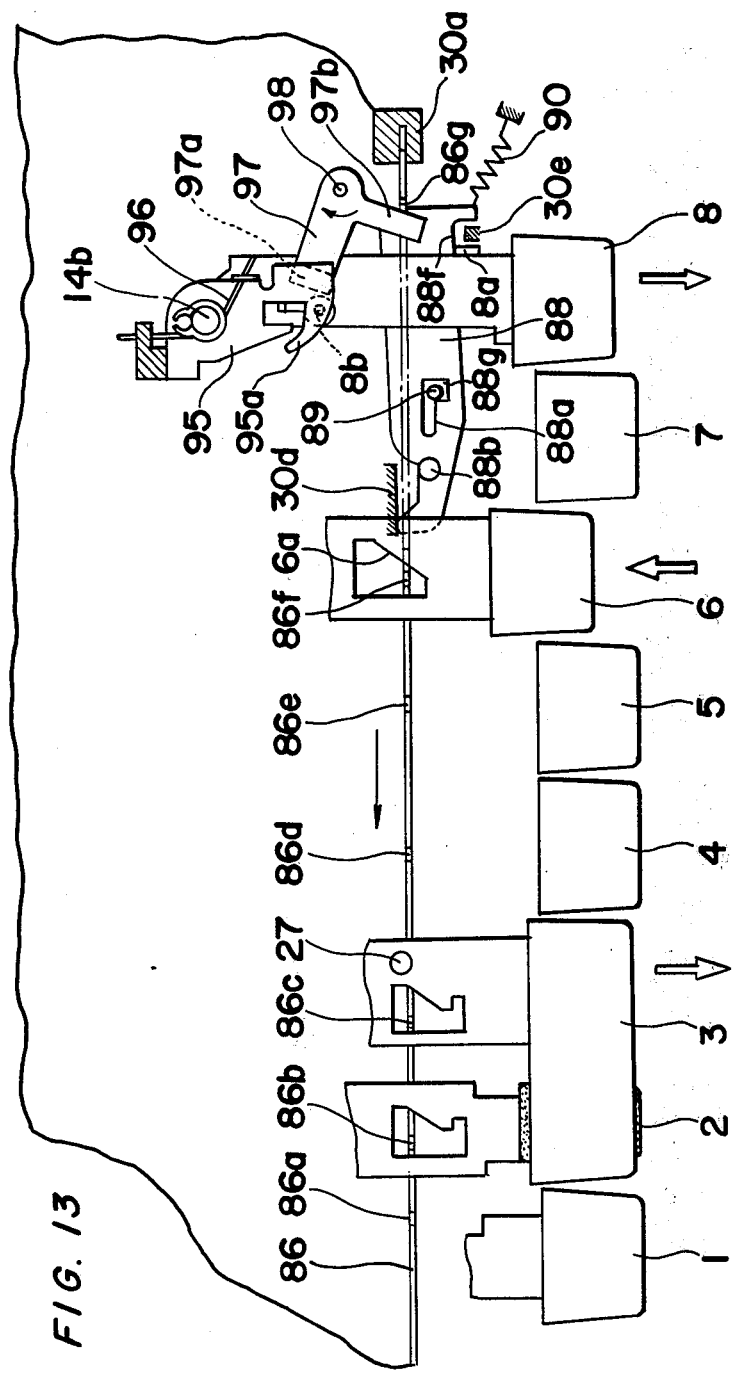
FIG. 13 is a schematic top plan view showing positions of the main components of the apparatus of FIGS. 1 and 2 at a time when the stopping operation is effected after the apparatus has been in the condition of FIG. 12.

The automatic stopping change-over operation is described hereinbelow with reference to FIGS. 11 and 12.

Upon depression of the automatic stopping change-over push-button 8 during the recording operation, the operating portion 8a (FIG. 2) on the rod for push-button 8 engages the portion 88f on the lever 88 to move the latter, and thus to rotate the lever 88 counterclockwise about the fixed shaft 89. Accordingly, the engaging portion 88c on the lever 88 moves away from the engaging portion 30d on the lower base plate 30, with consequent movement of the engaging portion 88d to a position at which the portion 88d is out of engagement with the engaging projection 86h on the lock rod 86. Simultaneously, the engaging portion 95a on the lock plate 95 (FIG. 1) engages the lock pin 8b on the rod for push-button 8 and the pin 88e is brought to a position where it is engaged with the engaging portion 91a of the lever 91, and the rod for the automatic stopping change-over push-button 8 is locked in position. In this state, when the magnetic tape stops running, the tape running and stopping detecting device described earlier is actuated, and the operating portion 53a of the operating lever 53 engages the pin 88b on the lever 88 to move the latter. In this case, however, since the lever 88 is urged clockwise by the spring 90 about the point of contact thereof with the operating portion 8a on the rod for the automatic and stopping change-over push-button 8, and is guided by the fixed shaft 89 in the guide opening 88a, the lever 88 is shifted slantwise downwardly toward the left in FIGS. 11 and 12. When the engaging recess 88g in the lever 88 is brought to the position of the fixed shaft 89, the lever 88 is rotated clockwise by the urging force of the spring 90, and the engaging recess 88g is brought into engagement with the fixed shaft 89. In this case, when the lever 88 is further moved slantwise downwardly to the left in FIGS. 11 and 12 after the engaging recess 88g has engaged the fixed shaft 89, the cam portion 32a of the cam plate 32 is disengaged from the engaging claw portion 53c of the actuating lever 53 and thus the lever 53 is no longer subject to the in the counterclockwise direction about the shaft 51c. When the lever 88 moves slantwise downwardly to the left in FIGS. 11 and 12, the engaging portion 88d of the lever 88 is brought to a position where it is out of engagement with the engaging projection 86h not the lock rod 86, and therefore, the portion 88d of the lever 88 does not move the engaging projection 86h, so that the lock rod 86 holds the rods for the recording push-button rod 2 and the reproduction push-button rod 3 in the locked state. Meanwhile, since the pin 88e on the lever 88 has been brought to a position where it is engaged with the engaging portion 91a of the lever 91, the pin 88e rotates the lever 91 clockwise about the fixed shaft 92, so that the operating portion 91b of the lever 91 depresses the actuator 93a of the microswitch 93. By the above operation, the microswitch 93 is switched over from the solid line position to the dotted line position in FIG. 17, i.e., from the circuit for motor 10 and audio circuit 59 to the circuit for lamp 60. Therefore, although the power supply for the motor 10 and the audio circuit 59 is turned OFF, the lamp 60 is illuminated since the switch 61 remains ON. The above state, upon depression of the stopping push-button 6, since the engaging projection 86f on the lock rod 86 is moved by the operating portion 6a of the rod for the push-button 6 to shift the rod 86 toward the left in FIGS. 11 and 12, the engagements between the projection 86b and the engaging portion 2a of the rod for push-button 2, and also between the projection 86c and the engaging portion 3c of the rod for push-button 3 are ended, so that the rods for the recording and reproduction push-buttons 2 and 3 being returned respectively by the return springs 105 and 85. Accordingly, the switch 61 is switched to the OFF position shown by the dotted line in FIG. 17. Simultaneously, since the enagaging projection 86g engages the engaging portion 97b of the lever 97 (FIG. 1) to move the latter, the lever 97 is rotated clockwise about the fixed shaft 98 to rotate the lock plate 95 in the direction of its thickness by the inclined surface on the operating portion 97a. Consequently, the engaging portion 95a is disengaged from the lock pin 8a, and the rod for the automatic and stopping change-over push-button 8 is returned to the inoperative position by the action of the return spring 110. Accordingly, the lever 88 is no longer engaged by the operating portion 8a of the rod for the automatic stopping change-over push-button 8 and is rotated clockwise about the fixed shaft 89 in the engaging recess 88g by the force of the spring 90, and when the engaging wall portion 88c of the lever 88 engages the engaging portion 30d on the lower base plate 30, the lever 88 is rotated clockwise about the engaging wall portion 88c. Upon disengagement of the engaging recess 88g from the fixed shaft 89, the lever 88 is shifted toward the right in FIGS. 11 and 12 so as to be returned to the initial position, with simultaneous returning of the lever 91 and microswitch 93 to the initial positions.

It is to be noted here that even when the switch 61 is turned OFF as stated earlier, the motor 10 continues to rotate unless the switch 113 is turned OFF. In this state, however, since the push-button operating portion is inoperative, the magnetic tape remains stationary, and the transmission of power to the tape running and stopping detecting device is interrupted, since the roller 34 is spaced from the capstan pulley 11, and the automatic stopping changeover device is inoperative. Accordingly, when each of the operations for the reproduction, recording, fast forwarding and rewinding is effected, quick response for each function can be expected, since the capstan pulley is already rotating.

It is to be noted here that in the foregoing embodiment, although the present invention is mainly described with reference to a magnetic tape recording and reproduction apparatus, the concept of the present invention is not limited to such magnetic tape recording and reproduction apparatus, but is readily applicable to an apparatus exclusively for magnetic tape recording or reproduction, for example, to a magnetic tape reproducing apparatus for use in automobiles and the like through minor alterations in the arrangement.

As is clear from the foregoing description, according to the present invention, since the automatic stopping means is caused to become inoperative by interrupting transmission of power from the motor to the tape running and stopping detecting device when the push-button operating mechanism is in the inoperative state, generation of annoying intermittent noise when the push-button operating mechanism is not being operated is eliminated, while deformation or wearing of the component parts of the automatic stopping means is appreciably reduced, with consequent minimization of malfunctions and prolonged life of the apparatus.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A magnetic tape recording and reproducing apparatus comprising:
   a motor means for driving the tape for recording and playback;
   a slidable support plate slidably mounted on said apparatus and having means thereon for engaging the tape for recording on and/or reproducing from the tape and being movable between an advanced position in which the motor is connected for driving the tape and a retracted position spaced a predetermined distance from the advanced position in which the tape is not driven;
   a push-button manipulating means for moving the slidable support plate to the advanced position;
   an automatic stopping safety means having a detector means for detecting an interruption of movement of the magnetic tape and moving means driven by said motor for returning the push-button manipulating means to an inoperative position in response to the interruption of the movement of the tape;
   a first actuating member having a temporary stop button means operatively connected thereto and operable to move the slidable support plate to the retracted position when said temporary stop button means is manipulated;
   a second actuating member having a cuing and review button means operatively connected thereto and operable to move the slidable support plate to the retracted position when said cuing and review button means is manipulated, said second actuating member, when said support plate is moved to the retracted position by said first actuating member, being freed to move to a pivoted position corresponding to its position to which it is moved by said cuing and review button means;
   a third actuating member connected to said second actuating member and having moving means connected thereto for moving said third actuating member both when said second actuating member is moved by said cuing and review button means and when said second actuating member is freed for movement by the actuating of said first actuating member by said temporary stop button means, said second actuating member, when it is freed, being moved to the pivoted position by the movement of said third actuating member; and
   a pivotally supported lever with which said third actuating member is engaged and engaged with said automatic stopping safety means and operable in response to the movement of said third actuating member for interrupting the drive of said moving means by said motor means, whereby said automatic stopping safety means is prevented from operating when said apparatus is operated for temporarily stopping the running of the tape for a cuing or reviewing operation.

2. An apparatus as claimed in claim 1 in which said tape engaging means on said sliding plate is at least one magnetic head for recording and/or reproducing.

3. An apparatus as claimed in claim 1 in which said tape engaging means on said sliding plate is a pinch roller.

* * * * *